(12) United States Patent
Wilson

(10) Patent No.: US 7,877,447 B2
(45) Date of Patent: *Jan. 25, 2011

(54) METHOD AND SYSTEM FOR MANAGING REJECTED MESSAGES

(75) Inventor: Jeffrey Kenneth Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 442 days.

This patent is subject to a terminal disclaimer.

(21) Appl. No.: 11/530,648

(22) Filed: Sep. 11, 2006

(65) Prior Publication Data

US 2008/0065719 A1 Mar. 13, 2008

(51) Int. Cl.
*G06F 15/16* (2006.01)
*G06F 15/173* (2006.01)

(52) U.S. Cl. ...................... 709/206; 709/224
(58) Field of Classification Search .......... 709/201–207
See application file for complete search history.

(56) References Cited

U.S. PATENT DOCUMENTS

| | | | |
|---|---|---|---|
| 6,072,942 A * | 6/2000 | Stockwell et al. | 709/206 |
| 6,708,205 B2 * | 3/2004 | Sheldon et al. | 709/206 |
| 6,973,486 B2 | 12/2005 | Blakeney | |
| 7,353,257 B2 | 4/2008 | Pettigrew et al. | |
| 2003/0110224 A1 | 6/2003 | Cazier et al. | |
| 2003/0134621 A1 | 7/2003 | Yabe et al. | |
| 2004/0024775 A1 * | 2/2004 | Kemp | 707/102 |
| 2004/0215724 A1 | 10/2004 | Smoot et al. | |
| 2005/0120085 A1 * | 6/2005 | Ito et al. | 709/206 |
| 2005/0198155 A1 | 9/2005 | Zakharoff | |
| 2006/0112166 A1 * | 5/2006 | Pettigrew et al. | 709/206 |
| 2007/0134642 A1 * | 6/2007 | Chuah | 434/350 |
| 2008/0065730 A1 | 3/2008 | Wilson | |
| 2008/0065761 A1 | 3/2008 | Wilson | |
| 2009/0019126 A1 * | 1/2009 | Adkins | 709/206 |

* cited by examiner

*Primary Examiner*—Joseph E Avellino
*Assistant Examiner*—Afshawn Towfighi
(74) *Attorney, Agent, or Firm*—Yee & Associates, P.C.; Justin M. Dillon

(57) ABSTRACT

A computer-implemented method, apparatus, and computer program product for managing rejected messages. Metadata is extracted from a message for storing information about the message in response to the message being rejected. The metadata is saved in an entry in a file. The file may be examined to identify the rejected messages. An intended recipient is notified of a rejection using the metadata.

18 Claims, 3 Drawing Sheets

METHOD AND SYSTEM FOR MANAGING REJECTED MESSAGES

BACKGROUND

1. Technical Field

The present invention relates generally to an improved data processing system. More particularly, the present invention relates to a computer-implemented method, apparatus, and computer program product for managing rejected messages.

2. Description of the Related Art

Modern computing technology has resulted in immensely complicated and ever-changing environments. The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called transmission control protocol/Internet protocol (TCP/IP).

The Internet has revolutionized communications and commerce, as well as being a source of both information and entertainment. For many users, email is a widely used format to communicate over the Internet. The existence and continued acceptance and use of the Web and the Internet have resulted in many new and useful applications becoming available to users of the Internet. One useful and popular application that most everyone with access to the Internet uses is electronic mail (email). Email is an electronic message sent over connections between data processing systems on a network. Email allows for a method of personal communication without requiring face-to-face contact. An email account allows a user to communicate a message to an intended email recipient. This type of communication is available even if the recipient has a different service provider than the sender. Email is typically based on a standard communication protocol that allows the communication of messages between individuals that may have different service providers. Email allows communication across the different communication protocols using only the recipient's email address.

Many email servers maintain user space quotas. These quotas limit the amount of storage that a user is allowed to take up for storing email. For most businesses with large storage capacities and for individual users who typically receive very small email, this is not usually much of an issue. However, for the growing number of small businesses who are becoming more and more expected to handle email as part of their every day business, ensuring a constant "online" status while managing expenses can be a challenge. For example, most customers now expect everyone from their lawn service provider to bakery to have a website and/or email contact information.

These companies cannot afford in-house email servers or expensive large quotas or backup systems. Typically, these companies provide their customers with email addresses or personal Internet access accounts from free online services, such as Yahoo® or Hotmail®. Free email services provide base-level access but often set limits on memory space or other quotas.

The problem for an organization, such as a business, is that the employees do not have consistent or predictable email access. The employees are engaged in producing or delivering products or providing the service of the company, such as baking cakes, making deliveries, framing houses, landscaping yards, and the like. As a result, large emails may push a user past a designated quota, resulting in the email to the account being blocked for hours or even days. Similarly, the employee or owner may not notice that emails from customers or potential customers are being bounced back and not reaching the employee or owner. As a result, customers may be expecting an answer or feel they have wasted their time, and some of the customers and potential customers may take their business elsewhere. At the very least, un-received messages portray the business in a negative light with respect to responsiveness.

BRIEF SUMMARY

The illustrative embodiments described herein provide a computer-implemented method, apparatus, and computer program product for managing rejected messages. Metadata is extracted from a message for storing information about the message in response to the message being rejected. The metadata is saved in an entry in a file. The file may be examined to identify the rejected messages. An intended recipient is notified of a rejection using the metadata.

BRIEF DESCRIPTION OF THE DRAWINGS

The novel features believed characteristic of the illustrative embodiments are set forth in the appended claims. The illustrative embodiments, themselves, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
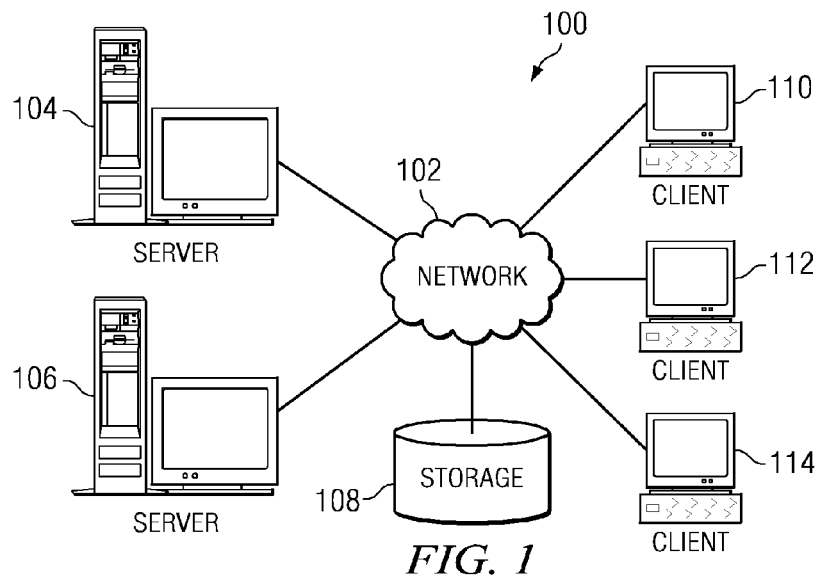
FIG. 1 is a pictorial representation of a data processing system in which illustrative embodiments of the present invention may be implemented.
Figure 2:
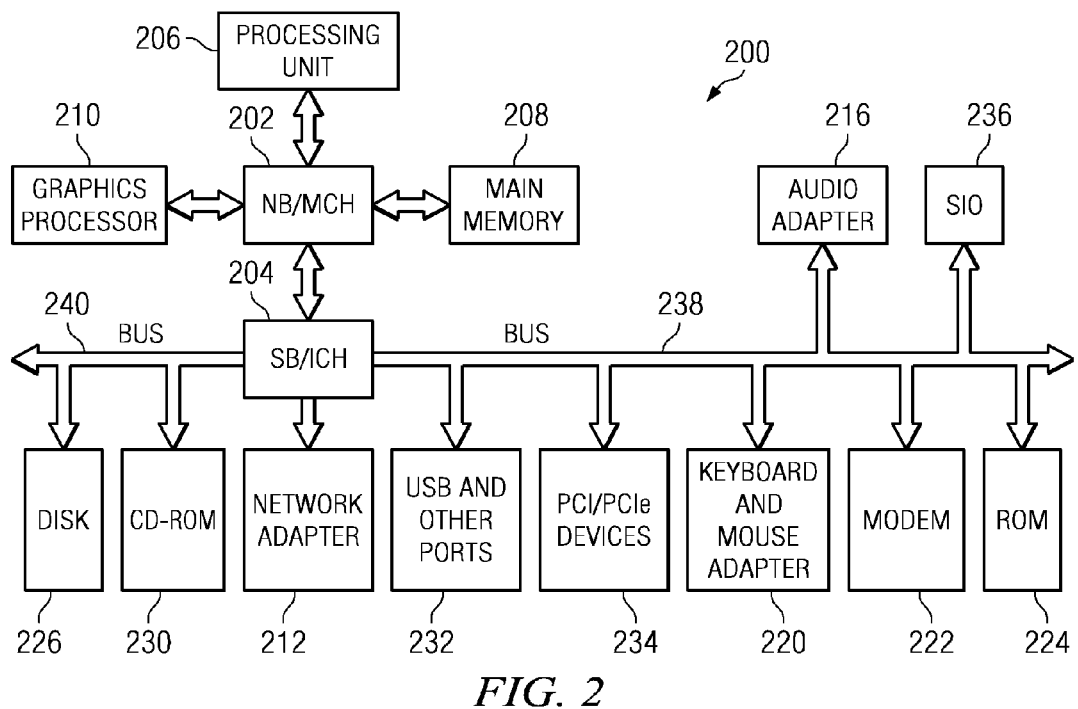
FIG. 2 is a block diagram of a data processing system in which illustrative embodiments of the present invention may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which one or more embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 of FIG. 1, in which computer usable code or instructions implementing processes or methods as described herein may be located for illustrative embodiments of the present invention.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

In the illustrative embodiment of FIG. 2, an operating system runs on processor 206 and coordinates and provides control of various components within data processing system 200. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provide calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
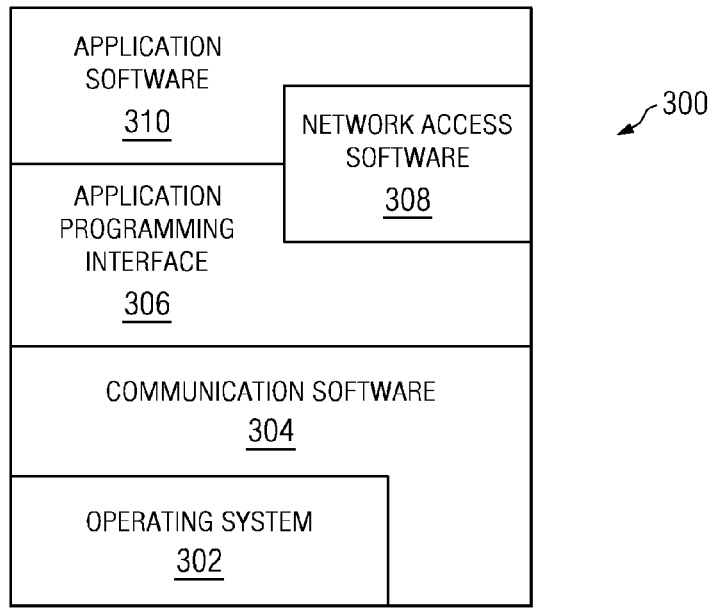
FIG. 3 is a block diagram depicting typical software architecture for a server-client system in which illustrative embodiments of the present invention may be implemented.

Turning to FIG. 3, typical software architecture for a server-client system is depicted in which illustrative embodiments of the present invention may be implemented. At the lowest level, operating system 302 is utilized to provide high-level functionality to the user and to other software. Such an operating system typically includes a basic input output system (BIOS). Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers.

Application software 310 represents any number of software applications designed to react to data through the communications port to provide the desired functionality the user seeks, such as email messaging clients. Applications at this level may include those necessary to handle data, video, graphics, photos, or text which can be accessed by users of the Internet. The illustrative embodiments may be implemented in any of the software elements of FIG. 3. In particular, the illustrative embodiments may be implemented in application software 310, such as email application software, implemented on an email server such as server 104 of FIG. 1. The email application used by a user to access email on a server may be implemented using network access software 308 on a client such as client 110 of FIG. 1.

The illustrative embodiments provide a computer implemented method, apparatus, and computer program product for managing rejected messages. The illustrative embodiments allow emails that are rejected back to the sender to be tracked by extracting important information. The important information is saved in storage space allocated for email messages that would not otherwise be received because the user has exceeded a quota. The extracted information may include minimal information for determining who sent the message and when, as well as the specified subject of the email message.

Email messages are most frequently rejected for surpassing a specified quota. The quota is a rule, term, parameter, or other limitation for the email server. The most frequent reason for email rejection results from the user exceeding a storage quota. Most email servers have quotas set in megabytes. Such storage quotas may be quickly surpassed when email messages include pictures, videos, or other memory intensive attachments, files, or objects. In another example, the user may have a quota specifying the maximum number of messages that may be received in a day. The quota may also specify that certain types of files, such as executable files, are unacceptable and therefore automatically rejected. Messages may also be rejected based on questionable or inappropriate content that may include viruses or other malicious programs. There may be any number of reasons why a message is rejected in addition to those examples provided herein. The illustrative embodiments allow a user to effectively deal with email server user quotas.

Figure 4:
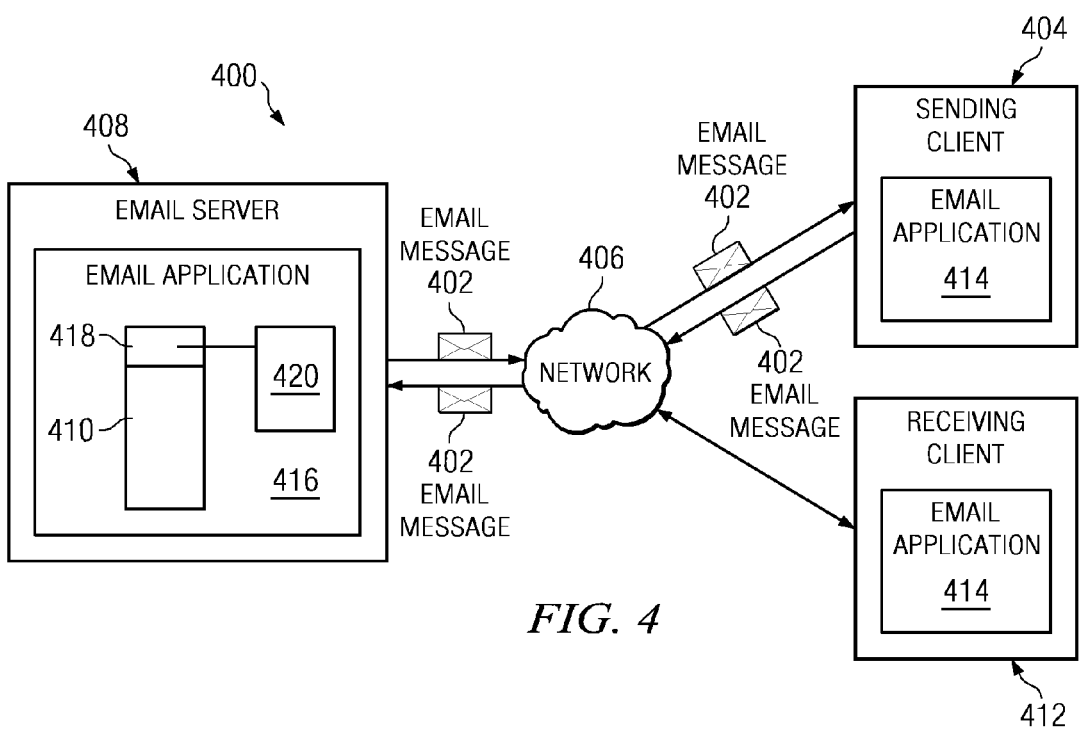
FIG. 4 is a block diagram of an email exchange system in accordance with an illustrative embodiment of the present invention.

FIG. 4 is a block diagram of an email exchange system in accordance with an illustrative embodiment of the present invention. Email exchange system 400 is an exemplary system for sending and receiving email messages. In one example, email message 402 is generated and sent from sending client 404 through network 406 to email server 408. Sending client 404 is used only for illustration purposes. Any number of sending clients may send messages in email exchange system 400. In this example, email message 402 is rejected from being received by email server 408 because the user has exceeded quota 410. As described, quota 410 is a storage quota but may take other forms. Subsequently, email message 402 or a rejection notification may be returned to sending client 404, indicating that email message 402 was rejected by email server 408. As a result, the user or receiving party is unable to receive email message 402 at receiving client 412.

Sending client 404 and receiving client 412 may be clients, such as clients 110, 112, and 114 of FIG. 1. Email server 408 may be a server, such as servers 104 and 106 of FIG. 1. Sending client 404, receiving client 412, and email sever 408 may communicate through network 406 using a land or hard line, such as fiber optics, telephone, cable, power lines, or may be received wirelessly.

Sending client 404 and receiving client 412 may use email application 414 to send and receive messages. Email application 414 may be a program application, such as Microsoft Outlook®, Eudora®, and other commonly used email applications. Alternatively, email application 414 may be an Internet browser or similar application for accessing email application 416 of email server 408. For example, a user accessing receiving client 412 may use Internet Explorer® to access email application 416, such as Yahoo® Mail on email server 408. Email applications 414 and 416 may be software applications, such as application software 310 of FIG. 3. Alternatively, email application 414 may be network access software, such as network access software 308 of FIG. 3.

In one illustrative embodiment, email server 408 allocates a portion of quota 410 as reserve 418. Reserve 418 is an allocated amount of storage or space, such as 100 kilobytes, used to store metadata about rejected messages. Metadata is limited data about email message 402 which may specify the sender, the subject, and the history of email message 402, such as when email message 402 was sent, rejected, and why. Reserve 418 may be specified by the user, email server administrator, or may simply be a default setting. In one embodiment, reserve 418 is an amount of storage above and beyond quota 410.

Reserve 418 is used to store rejected message file 420. Rejected message file 420 is information or metadata extracted from a rejected message, such as name, email address, subject line, and date and time. Rejected message file 420 includes entries for each rejected message in concise terms so that each entry consumes very little space in reserve 418. Rejected message file 420 is further described in FIG. 5.

Additionally, the receiving user, email administrator, or email application 416 may establish key word searches, filters, or extraction code for further extracting additional information. For example, if a user sends email message 402 from sending client 404 including a standard signature which includes a phone number, the phone number may be added to the entry in rejected message file 420 for the rejected message.

Rejected message file 420 allows a user to obtain useful information from email message 402 even though email message 402 was bounced back to sending client 404. As a result, the receiving user may use the information to contact the sending party to re-establish contact and further clarify the purpose of email message 402. In the example of a potential customer, the receiving user may establish contact based on an entry in rejected message file 420 to confirm the receipt of an order or service request.

Rejected message file 420 may be accessed by the receiving user through email applications 414 or 416. In one illustrative embodiment, a notice is flashed to email application 414 of receiving client 412 when the receiving user accesses email application 414 indicating entries are present in rejected message file 420. The notice allows the receiving user to take action to contact the senders and remedy the quota problem. In one illustrative embodiment, rejected message file 420 may be displayed as a message in the message inbox of email application 414 of receiving client 412 for easy access and prominence.

In one example, if the quota is 10 Mb and 100 kb is specified for reserve 418, once the quota reaches 9.9 Mb, received messages are bounced back to sending client 404.

Figure 5:
FIG. 5 is an exemplary rejected message file in accordance with an illustrative embodiment of the present invention.

FIG. 5 is an exemplary rejected message file in accordance with an illustrative embodiment of the present invention.

Rejected message file 500 is a file, such as rejected message file 420 of FIG. 4. Rejected message file 500 may be stored in a reserve, such as reserve 418 of FIG. 4. As previously mentioned, rejected message file 500 is preferably displayed to a user that may be unaware that incoming messages are being rejected because of a quota, such as quota 410 of FIG. 4. Rejected message file 500 may be displayed to the user through an email application, such as email applications 414 and 416 of FIG. 4. The rejected message file may be downloaded to a device, such as receiving client 412 of FIG. 4, displayed in an inbox, or otherwise accessed or displayed to the user.

Rejected message file 500 may include alert 502, specifying the number of messages, such as email message 402 of FIG. 4, that have been bounced or otherwise rejected. In this example, alert 502 specifies that there are three rejected messages. Rejected message file 500 includes entry 1 504, entry 2 506, and entry 3 508 corresponding to the number of rejected messages.

Entry 1 504 includes a number of fields which specify email address 510, subject line 512, and date/time 514 of the most recently rejected email messages. Based on entry 1 504, the user may determine who to respond to, as well as the subject of the rejected message and when the message should have been received. Alternatively, the entry may also list the reason the email message was rejected, the names of attachments, a number of individuals listed or copied on the message, the email priority, day received, signature, first sentence or other information as specified by the user.

The limited amount of information extracted from the original message allows a large number of entries to be recorded without surpassing the storage space allocated for the reserve. Entry 2 506 and entry 3 508 include fields similar to those of entry 1 504. In addition, the user may set a search term to extract text following the key words, phone or phone number, so that the user may call the message sender based on rejected message file 500. As a result, a field entitled phone 516 is extracted for entry 3 508, the first message that was rejected from being stored on an email server, such as email server 408 of FIG. 4.

Any number of custom fields, search terms, or filters may be established in an email application to further retrieve information from a rejected message. The user may select to delete entries or clear rejected message file 500 to clear more space or so that the user knows the rejected messages have been dealt with.

Figure 6:
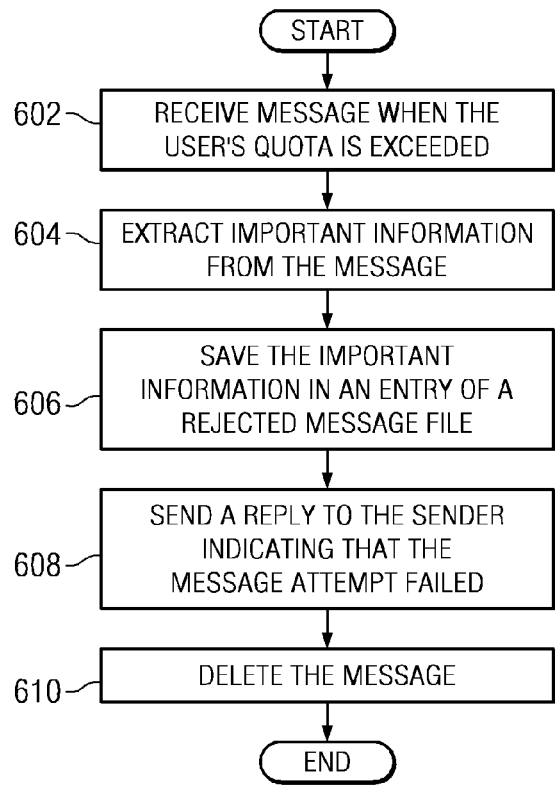
FIG. 6 is a flowchart illustrating a process for handling email server user quotas in accordance with an illustrative embodiment of the present invention.

FIG. 6 is a flowchart illustrating a process for handling email server user quotas in accordance with an illustrative embodiment of the present invention. The process in FIG. 6 may be implemented in an email server by an email application, such as email server 408 containing email application 416 of FIG. 4. The process begins by receiving a message when the user's quota is exceeded (process block 602). For example, the message may be a 1 MB email where there is less than 1 MB of available space in the user's quota, such as quota 410 of FIG. 4. In process block 602, the email server determines that the message will be rejected based on software stipulations or other application rules. For example, the user may not be allowed to send or receive executable files because of the threat of malicious programs. As a result, an executable file that is received is automatically rejected.

Next, the email application extracts important information from the message (process block 604). The important information may include fields stored in the form of an entry, such as entry 1 504 of FIG. 5. In one example, the user may have established preferences so that only the email address and timestamp of the message is extracted. In another example, a small business owner may have set preferences to extract a username, email address, subject, timestamp, and the first one hundred characters of the email in process block 604.

Next, the email application saves the important information in an entry of a rejected message file (process block 606). The rejected message file may be a file, such as rejected message file 500 of FIG. 5. If there are already entries, the email application saves the important information as another entry. In one embodiment, the entries may be saved in chronological order to allow the user to establish a timeline for rejected messages. A reserve, such as reserve 418 of FIG. 4, has previously been specified for the quota by default, by the email administrator, or by the user. For example, the user or business may have established 100 Kb of storage for storing the important information or metadata of the message.

Next, the email application sends a reply to the sender indicating that the message attempt failed (process block 608). The sender may have sent a message, such as email message 402 of FIG. 4 that is returned to a device, such as sending client 404 of FIG. 4. Next, the email application deletes the message (process block 610) with the process terminating thereafter.

Figure 7:
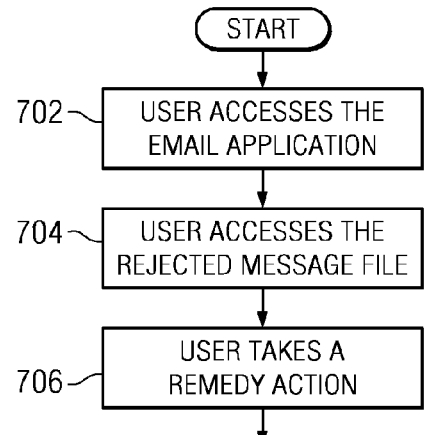
FIG. 7 is a flowchart illustrating user interaction with an email server quota handling system in accordance with an illustrative embodiment of the present invention.

FIG. 7 is a flowchart illustrating user interaction with an email server quota handling system in accordance with an illustrative embodiment of the present invention. The process in FIG. 7 may be implemented by a user accessing an email application of a sending device, such as email application 414 on sending client 404 of FIG. 4.

The process begins with the user accessing the email application and noticing that the user quota is exceeded (process block 702). The user may access the email application by opening the email application or by going online and logging in to an email application or other service provider. The quota may be a quota, such as quota 410 of FIG. 4. The user may notice that the server has been overloaded because of an alert or notice, such as alert 502 of FIG. 5. The user may also be notified that a rejected message file, such as rejected message file 420 of FIG. 4, includes new entries. Next, the user accesses the rejected message file (process block 704). As previously described in process block 704, the user may access the rejected message file through a message in the inbox or by downloading or otherwise viewing the rejected message file. In process block 704, the user may view information of customers, potential customers, businesses, or other individuals that attempted to send messages to the user once the quota was exceeded and the messages were rejected. This information is displayed to the user on the client device automatically when accessing the email application or at the user's request.

Next, the user takes a remedy action (process block 706) with the process terminating thereafter. For example, the user may attempt to contact one or more senders that have had messages rejected. The remedy action allows the user to take whatever step is necessary to contact, ignore, or otherwise respond to the one or more rejected messages.

Thus, the illustrative embodiments provide a computer implemented method, apparatus, and computer program product for handling email server user quotas. Messages sent to a user and subsequently rejected are logged, cataloged or otherwise recorded. Important information is extracted and saved in a file within a reserve so that the information may be accessed later. Because only portions of the message are extracted, large numbers of messages may be recorded using very little memory or storage. The user may specify the size of the reserve and additional information to extract from the message. The entries may be used by the user to take a remedy action, such as contact the sending party.

Embodiments of the present invention may be implemented entirely in hardware, entirely in software or using a combination of both hardware and software elements. In one embodiment, the invention is implemented in software, including but not being limited to firmware, resident software, microcode, or the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a communication medium (e.g., a system bus). The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention embodiments in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for managing rejected messages, the computer implemented method comprising:
   a plurality of steps performed by a processor in an email server, the plurality of steps comprising:
   receiving a storage quota of disk space for a user;
   allocating a portion the storage quota of disk space for the user to form a storage space for a rejected message file;
   receiving a message for the user from a sending party by the email server, the message including metadata and message text;
   calculating a remaining storage quota of disk space for the user, wherein the remaining storage quota of disk space is calculated based on an unused portion of the storage quota of disk space for the user that does not include the storage space for the rejected message file;
   responsive to a size of the message exceeding the remaining storage quota of disk space, rejecting the message, wherein the storage space for the rejected message file is reserved;
   responsive to the message being rejected, extracting metadata and a portion of the message text from the message based on user preferences for storing information about the message in the rejected message file for the user further comprising:
   responsive to extracting the information from the message, discarding a remaining portion of the message, and
   saving the information in an entry in the rejected message file, wherein the entry is one of a plurality of entries in the rejected message file, and wherein the plurality of entries in the rejected message file are examined to identify a plurality of rejected messages that were sent to the user; and
   notifying an intended recipient of a rejection using the information of one of the plurality of entries in the rejected message file.

2. The computer implemented method of claim 1, wherein the message is rejected for containing an executable file.

3. The computer implemented method of claim 1, further comprising:
   receiving a maximum number of messages for the user prior to receiving the message; and
   rejecting the message based on exceeding the maximum number of messages.

4. The computer implemented method of claim 1, wherein extracting the metadata from the message further comprises:
   extracting text from the message corresponding to fields within the entry specifying an email address, a subject, and a date and time.

5. The computer implemented method of claim 1, further comprising:
   responsive to the user accessing an email application, displaying the rejected message file to the user.

6. The computer implemented method of claim 5, wherein displaying the rejected message file to the user further comprises:
   specifying a number of the plurality of rejected messages in the rejected message file.

7. The computer implemented method of claim 1, wherein the user takes a remedy action based on the plurality of entries in rejected message file.

8. The computer implemented method of claim 1, wherein the message is an email.

9. The computer implemented method of claim 1, further comprising:
   specifying the portion of the storage quota of disk space as a specific amount of storage space to reserve for the rejected message file.

10. The computer implemented method of claim 1, further comprising:
   responsive to saving the information in the entry in the rejected message file, notifying the sending party of a message delivery failure.

11. A system comprising:
   a sending client operably connected to an email server for sending a message;
   the email server, wherein the email server runs an email application for sending and receiving email messages, and wherein the email server receives a message for a receiving client from a sending client, the message including metadata and message text;

wherein the email application receives a storage quota of disk space for the receiving client;

wherein the email application allocates a portion the storage quota of disk space for the receiving client to form a storage space for a rejected message file;

wherein the email application calculates a remaining storage quota of disk space for the receiving client, wherein the remaining storage quota of disk space is calculated based on an unused portion of the storage quota of disk space for the receiving client that does not include the storage space for the rejected message file;

wherein the email application rejects the message responsive to a size of the message exceeding the remaining storage quota of disk space, wherein the storage space for the rejected message file is reserved;

wherein the email application extracts metadata and a portion of the message text from the message based on user preferences for storing information about the message in the rejected message file for the receiving client responsive to the message being rejected, wherein the email application discards a remaining portion of the message responsive to extracting the information from the message, wherein the email application saves the information in an entry in the rejected message file, wherein the entry is one of a plurality of entries in the rejected message file, and wherein the plurality of entries in the rejected message file are examined to identify a plurality of rejected messages that were sent to the receiving client; and wherein the email application notifies an intended recipient of a rejection using the information of one of the plurality of entries in the rejected message file.

12. The system of claim 11, wherein the receiving client accesses the email server, wherein the email application displays the rejected message file to the receiving client.

13. The system of claim 12, wherein the receiving client accesses the rejected message file using a browser.

14. The system of claim 11, wherein the receiving client accesses the rejected message file using a client email application stored on the receiving client.

15. The system of claim 11, wherein the rejected message file includes a plurality of entries corresponding to a plurality of rejected messages.

16. The system of claim 11, wherein the receiving client specifies the portion of the storage quota of disk space as a specific amount of storage space to reserve for the rejected message file.

17. A computer program product for managing rejected messages, the computer program product comprising:

a non-transitory computer readable storage medium having computer usable program code stored thereon and executed by a processor, the computer usable program code comprising:

computer usable program code for receiving a storage quota of disk space for a user;

allocating a portion the storage quota of disk space for the user to form a storage space for a rejected message file;

receiving a message for the user from a sending party by the email server, the message including metadata and message text;

calculating a remaining storage quota of disk space for the user, wherein the remaining storage quota of disk space is calculated based on an unused portion of the storage quota of disk space for the user that does not include the storage space for the rejected message file;

responsive to a size of the message exceeding the remaining storage quota of disk space, rejecting the message, wherein the storage space for the rejected message file is reserved;

computer usable program code, responsive to the message being rejected, for extracting metadata and a portion of the message text from the message based on user preferences for storing information about the message in the rejected message file for the user further comprising:

computer usable program code for discarding a remaining portion of the message responsive to extracting the information from the message, and computer usable program code for saving the information in an entry in the rejected message file, wherein the entry is one of a plurality of entries in the rejected message file, and wherein the plurality of entries in the rejected message file are examined to identify a plurality of rejected messages that were sent to the user; and notifying an intended recipient of a rejection using the information of one of the plurality of entries in the rejected message file.

18. The computer program product of claim 17, the computer usable program code further comprising:

computer usable program code, responsive to saving the information in the entry in the rejected message file, for notifying the sending party of a message delivery failure; and computer usable program code, responsive to a user accessing an email application, for displaying the rejected message file to the user.

* * * * *